Aug. 8, 1933.   N. R. ANDREWS ET AL   1,921,446
AUTOMATIC CHARGING MEANS FOR CENTRIFUGAL EXTRACTORS
Filed Oct. 16, 1929   7 Sheets-Sheet 1
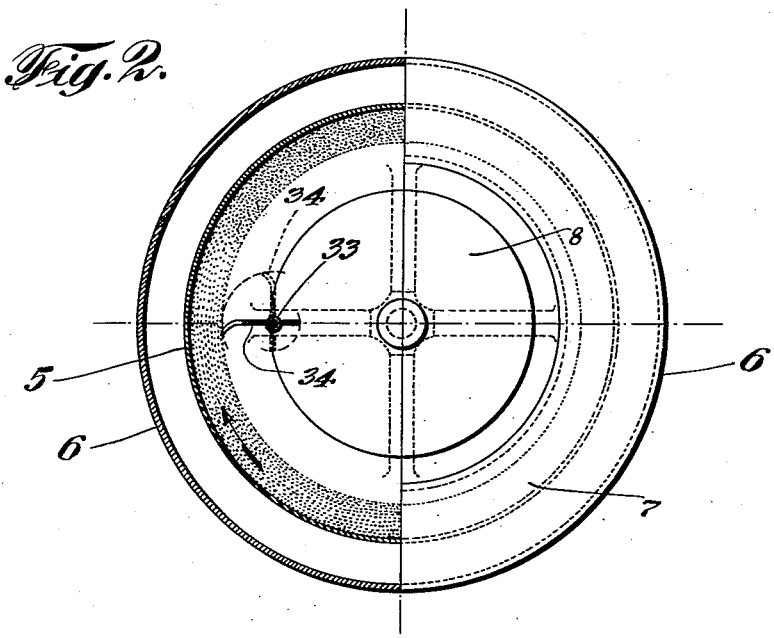
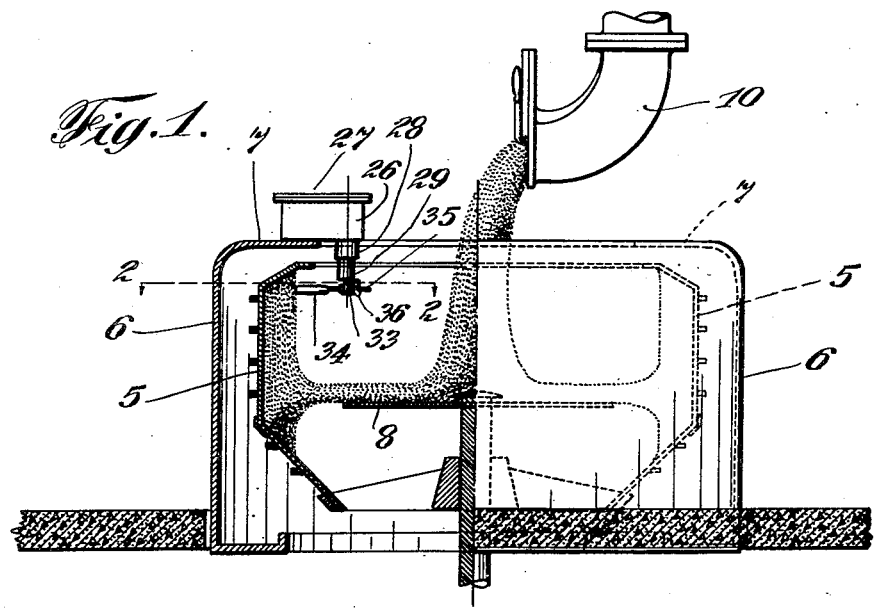
INVENTORS
Nathaniel R. Andrews and
Jacob J. Neuman
BY
their ATTORNEY

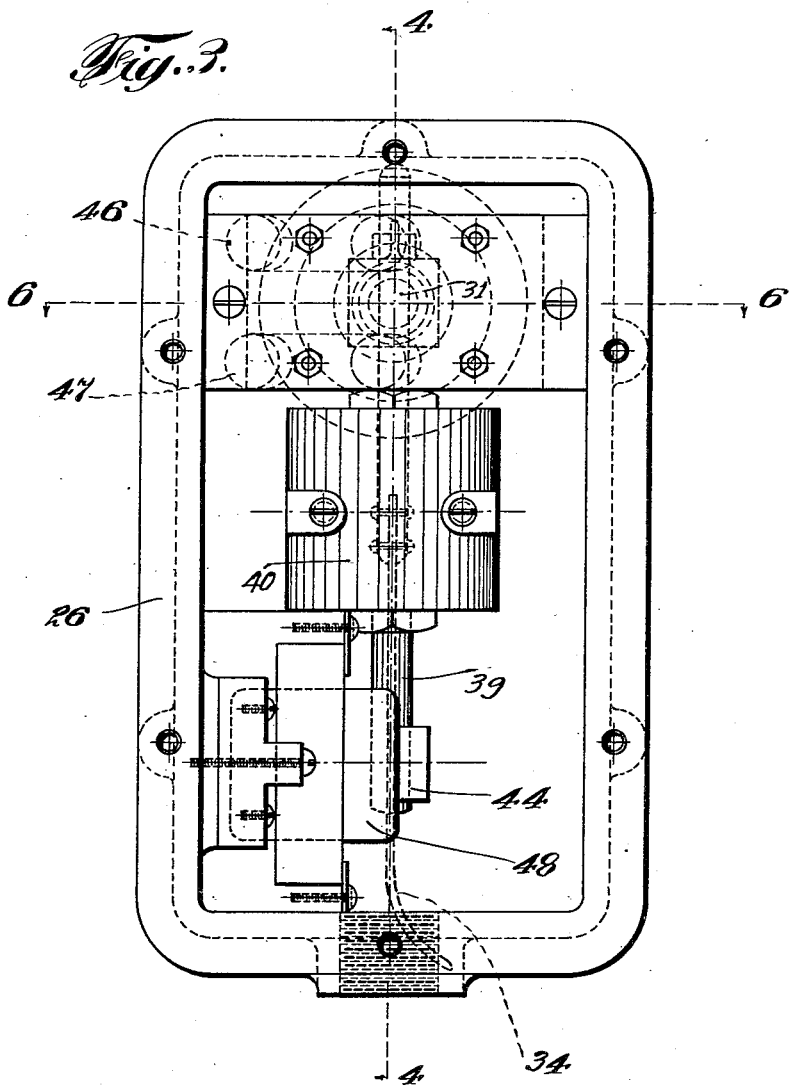

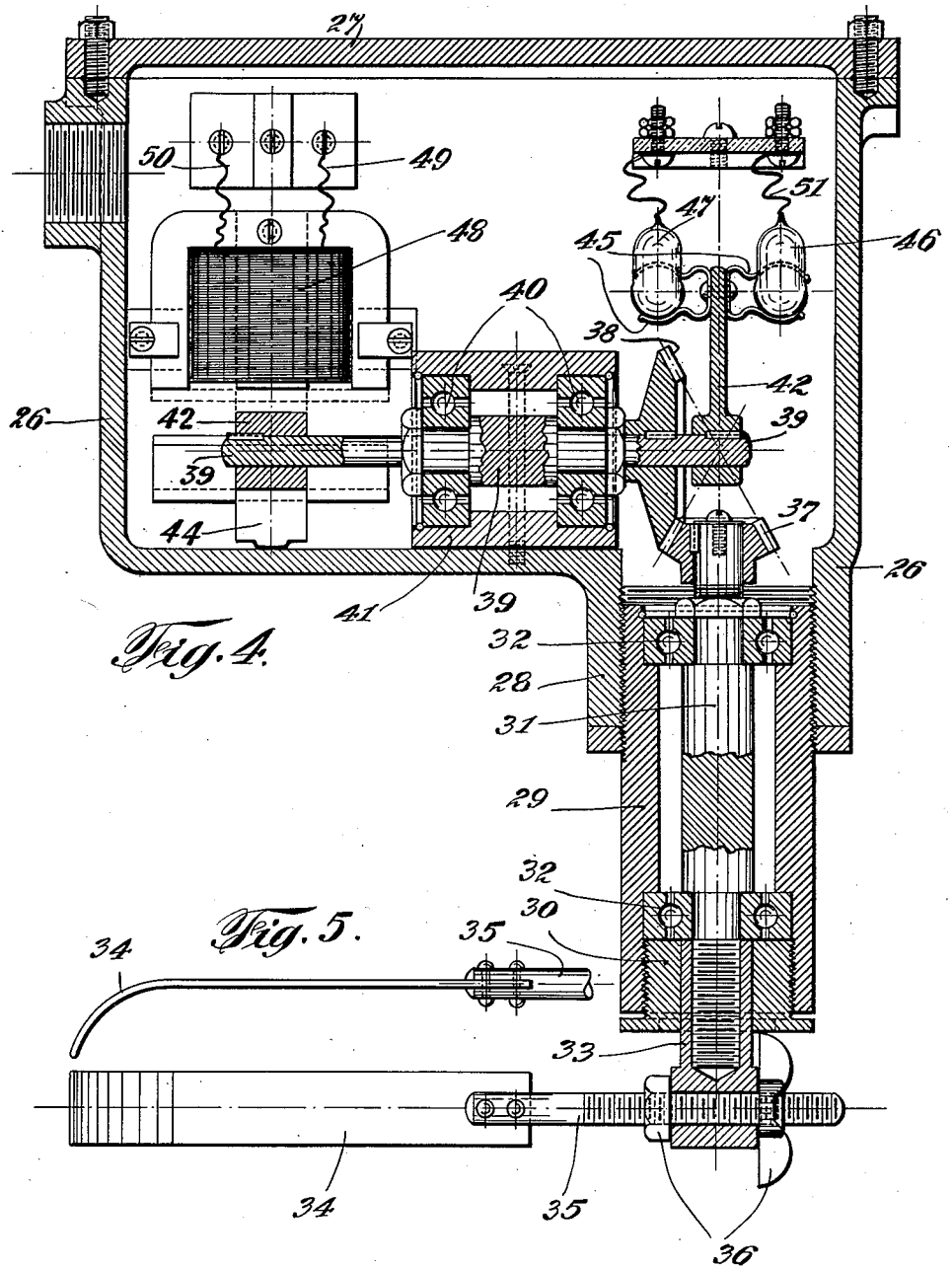

Aug. 8, 1933.  N. R. ANDREWS ET AL  1,921,446
AUTOMATIC CHARGING MEANS FOR CENTRIFUGAL EXTRACTORS
Filed Oct. 16, 1929  7 Sheets-Sheet 4

INVENTORS
Nathaniel R. Andrews
and Jacob J. Neuman
BY
their ATTORNEY

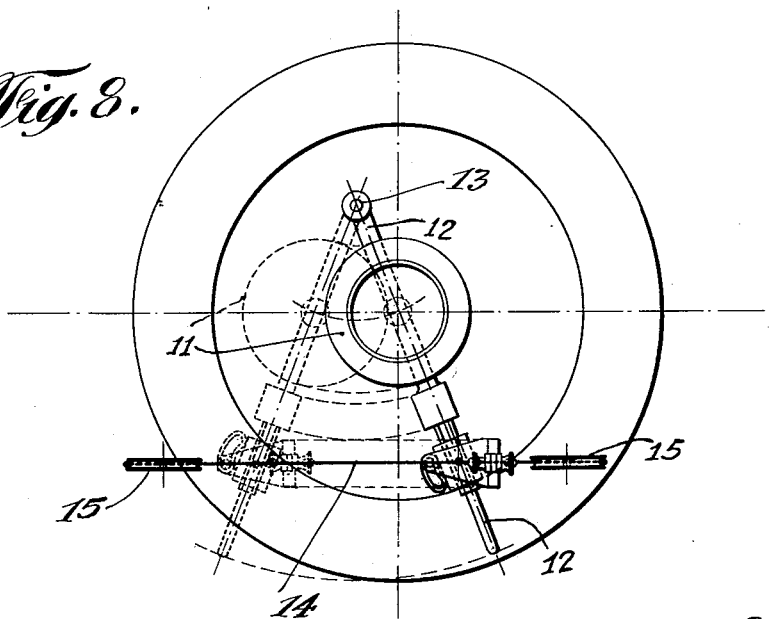
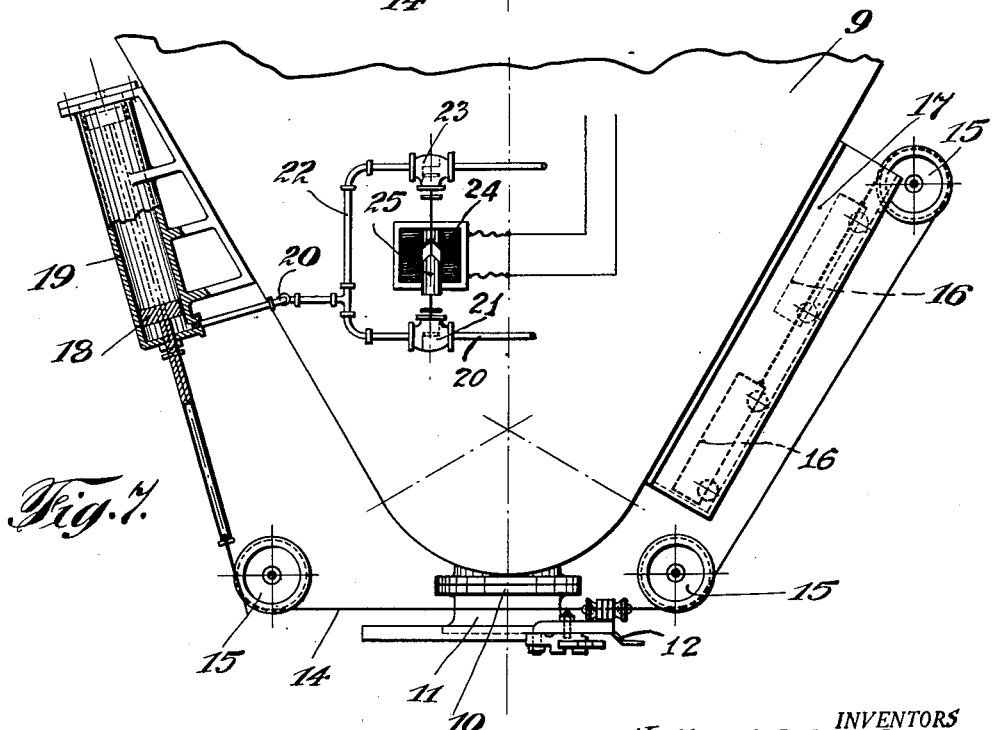

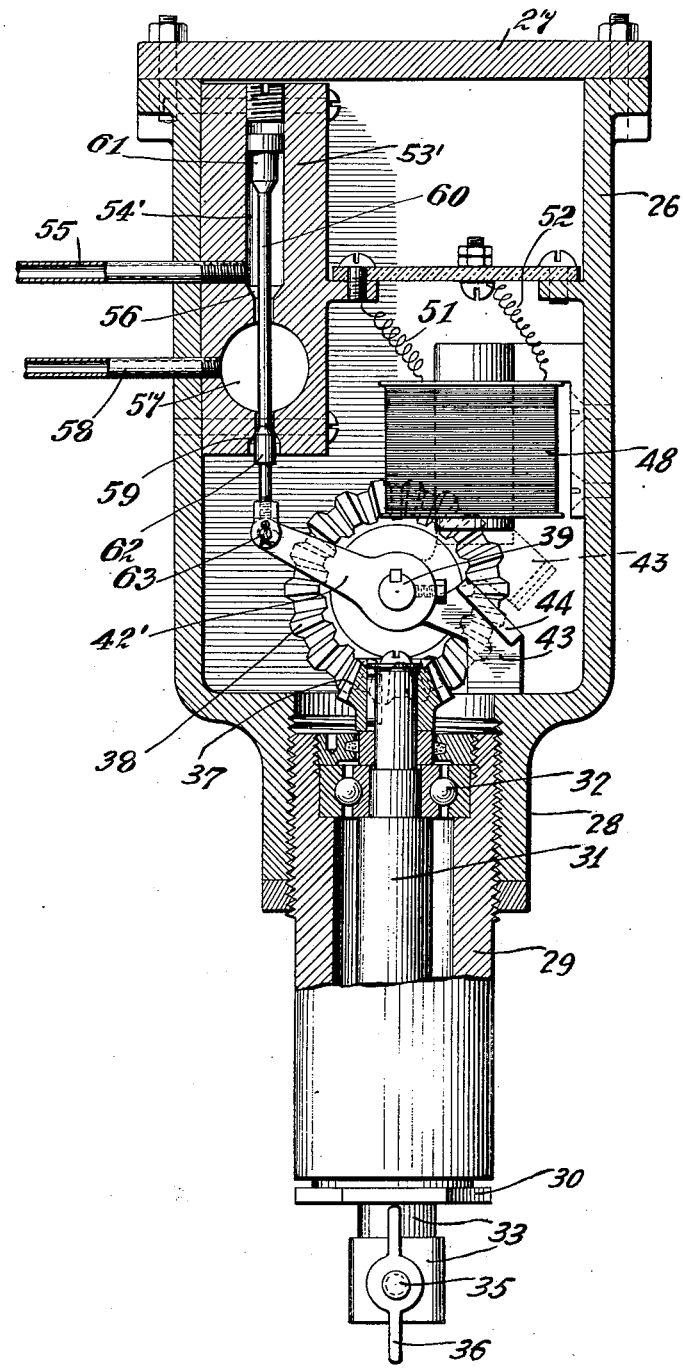

Patented Aug. 8, 1933

1,921,446

UNITED STATES PATENT OFFICE 1,921,446

AUTOMATIC CHARGING MEANS FOR CENTRIFUGAL EXTRACTORS

Nathaniel R. Andrews, Yonkers, and Jacob J. Neuman, New York, N. Y.

Application October 16, 1929. Serial No. 399,900

20 Claims. (Cl. 210—63)

This invention relates to automatic charging means for centrifugal extractors, and has for its primary object and purpose to provide a simple and positively operating means for automatically controlling the supply of fill-mass to the basket of centrifugal extractors such as are used in sugar refining and thus insure a uniform predetermined amount of fill-mass being delivered to the basket in each operation of the machine.

More particularly, in a preferred embodiment of the invention, the above result is accomplished by electro-mechanical means controlling the movements of a gate or valve to open and closed position and which includes a suitable switch actuated by the pressure of the accumulating fill-mass within the basket of the extractor upon a movable part to thereby make or break an electric circuit.

It is also a further general object of the invention to provide such an automatic charging means for centrifugal extractors, the several parts of which are of simple construction, and which may be readily applied in operative relation to the charge supply means of centrifugal extractors as at present in use and without necessitating any radical mechanical changes therein.

With the above and other objects in view, the invention consists in the improved automatic charge supply means for centrifugal extractors, and in the form, construction and relative arrangement of the several parts as will be hereinafter more fully described, illustrated in the accompanying drawings and subsequently incorporated in the sub-joined claims.

In the drawings wherein we have illustrated one simple and practical embodiment of the invention, and in which similar reference characters designate corresponding parts throughout the several views,—

Figure 1 is an elevation partly in section showing a centrifugal extractor of more or less conventional form with our improved automatic charge control device mounted upon the basket casing or housing;

Fig. 2 is a top plan view partly in section along the line 2—2 of Fig. 1;

Fig. 3 is a plan view of the device with the top or cover of the casing removed;

Fig. 4 is a vertical sectional view taken on the line 4—4 of Fig. 3;

Fig. 5 is a top plan view of the movable finger or blade;

Fig. 7 is a side elevation of the charge supply gate and the means for moving said gate to open and closed positions;

Fig. 8 is a plan view of the gate showing the movable member or valve thereof in full lines in its closed position and in dotted lines in its open position;

Fig. 10 is a vertical sectional view similar to Fig. 6 of this modified construction.

Figure 6:
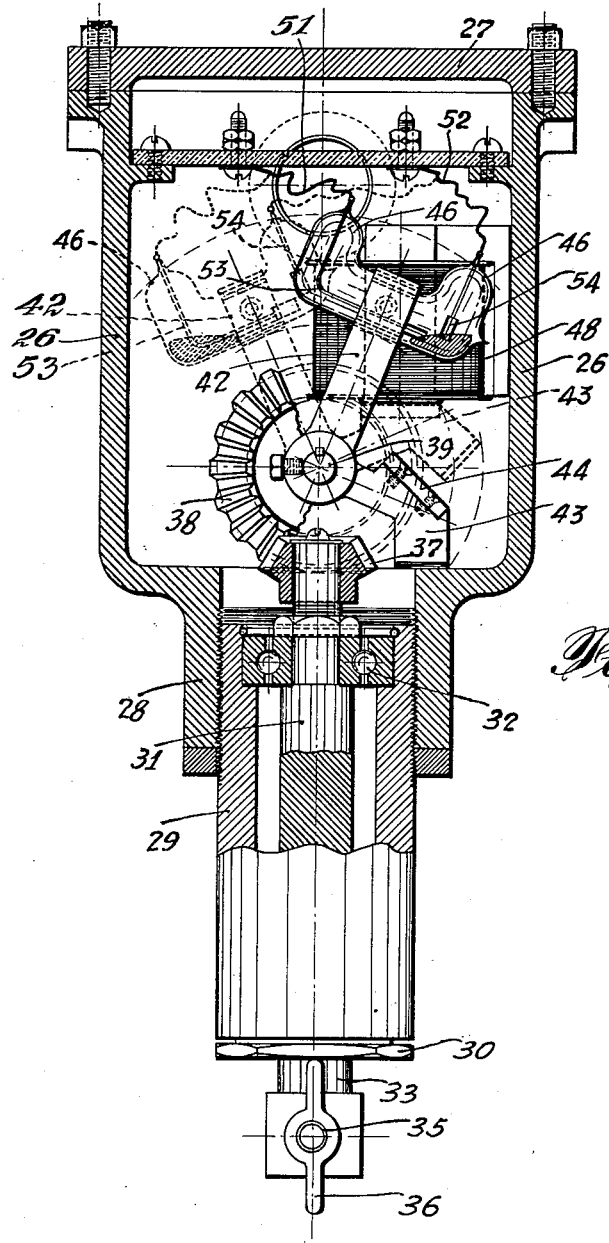
Fig. 6 is a transverse sectional view taken on the line 6—6 of Fig. 4.

In Figs. 1 and 2 of the drawings, we have shown a type of centrifugal extractor such as is used in refining sugar and in which the rotating basket 5 is enclosed within an outer casing 6 provided at its upper end with an inwardly extending annular curb or flange 7. Within said basket and rotating as a unit therewith the usual distributor plate 8 is arranged.

The fill-mass is discharged upon the plate 8 from a suitable hopper 9 having an outlet or discharge neck 10.

As clearly shown in Figs 7 and 8 of the drawings, this discharge neck of the hopper is provided with a movable gate or valve 11. In the present instance, we show this discharge valve or gate carried by a lever 12 pivoted at one of its ends as at 13, said valve being fixed upon the lever adjacent said pivot. To the lever 12 adjacent its other end, a wire or other flexible element 14 is suitably connected. This flexible element is trained around the spaced guides 15 and has one of its ends connected with a weight 16 mounted to travel in a suitable guide housing 17 secured on one side of the hopper 9. The other end of the flexible element 14 is connected to the rod or stem of a piston 18 which has reciprocating movement within a cylinder 19 mounted on the opposite side wall of the housing. To the lower end of this cylinder, compressed air, steam or other expansively acting fluid medium is supplied through the pipe 20. In the supply pipe, a suitable valve 21 is interposed. Between this valve and the cylinder 19, a branch pipe 22 is connected with the supply pipe and an exhaust valve 23 is interposed in the branch pipe 22 and arranged in line with the valve 21. Between these valves the solenoid 24 is located and has its core 25 connected with the movable elements of the two valves so that when the supply valve 21 is opened upon energization of the solenoid, the exhaust valve 23 is closed, and vice versa when the solenoid is de-energized.

It will thus be seen that as long as the exhaust connection with the cylinder 19 is open, and the weight 16 is at the lower point of its travel, the gate or valve 11 remains in its closed position and upon the opening of the supply valve 21 and the closing of the exhaust valve, the pressure fluid will be admitted to the cylinder 19 to move the piston 18 upwardly therein and through the flexible connection 14, move the gate or valve 11 to the open position shown in dotted lines in Fig. 8, while the weight 16 is moved upwardly within the casing 17. The means for automatically making and breaking the circuit of the solenoid 24, which constitutes the essential feature of the present invention is fully illustrated in Figs. 4 to 6 of the drawings, and will now be described in detail.

The housing or casing 26 for the mechanism is suitably mounted or supported upon the curb or flange 7 of the extractor casing, the upper end of said casing being closed by a suitable cover plate 27. This casing is provided at one end with a downwardly extending internally threaded boss or extension 28 in which the upper end of a tube 29 is threaded. Within the lower end of this tube the bushing 30 is threaded and provides a substantially moisture proof closure therefor.

A vertically disposed rod or shaft 31 extends through the tube 29 and is supported in suitable bearings 32 mounted in the opposite ends of said tube. To the lower end of this rod a sleeve 33 is detachably threaded and extends through the bushing 30. The lower end of said sleeve is closed and formed with an enlargement having an opening therethrough extending at right angles to the axis of the sleeve. This opening adjustably receives the threaded rod 35 of a curved blade 34, said rod being fixed in its adjusted position by nuts 36 threaded thereon and having clamping engagement against opposite sides of the tube 33.

The blade 34 consists of a strip of metal of suitable width having its free end curved as shown. It will be apparent that by adjusting the rod 35 in the part 33, the distance between the tip of the curved end of the blade 34 and the axis of the shaft or rod 31 may be regulated as desired.

To the upper end of the shaft 31 a beveled gear 37 is keyed or otherwise rigidly fixed and is in constant mesh with a relatively large beveled gear 38 fixed on the horizontal shaft 39 supported in the spaced bearings 40 mounted in the member 41 rigidly fixed to the bottom wall of the housing 26. To one end of the shaft 39 an arm 42 is secured at one of its ends. To the other end of the shaft 39 an arm 43 extending radially therefrom substantially at 90° to the arm 42 is fixed and carries the soft iron armature plate 44. The other end of the arm 42 has suitable spring clips 45 secured to opposite sides thereof which support the mercury switches 46 and 47 respectively, for oscillating movement with said arm.

An electro-magnet 48 is suitably mounted within the housing 26 and has the lower end of its core opposed to the armature plate 44. Electric current is supplied from an external source to the winding of the magnet 48 through the conductors 49 and 50. While I have shown two of the mercury switches, it will be evident that any desired number of these switches may be provided upon the arm 42 in accordance with the number of circuits to be controlled.

For the purpose of the present application, the description of one of these circuits will suffice. In Fig. 6 the circuit to be controlled by the mercury switch is connected with the switch through flexible conductors 51 and 52 which are connected respectively with terminals 53 and 54 which terminate within the mercury holding tube in closely spaced relation to each other. Thus when the switch is in the position shown in full lines in Fig. 6 of the drawings, the globule of mercury contacting with the spaced terminals 53 and 54 closes the circuit through the conductors 51 and 52. It will be apparent that by reversing the mounting of the switch on the end of the arm 42 or turning the same end for end, in the position of the arm as shown in full lines in Fig. 6, the circuit would be open. As shown however, the circuit is opened when the arm is swung over to the dotted line position seen in Fig. 6, and the globule of mercury moves into the other end of the tube and away from the spaced terminals 53 and 54. The weight of the armature carried by the arm 42 is sufficient to return the arm to the normal position shown in full lines in Fig. 6 when the magnet 48 is de-energized. In this position of the arm, the blade 34 is substantially parallel with the shaft 39, and in a diametrically extending relation to the basket 5 of the centrifugal as shown in full lines in Fig. 2 of the drawings.

The magnet 48 is so designed that when energized its strength is not sufficient to attract the armature 44 to the magnet core from the normal position shown in full lines in Fig. 6, but is sufficient to hold the armature stationary against the magnet core when said armature is brought into sufficiently close proximity to the core by other mechanical means.

Assuming that the device is mounted and arranged as shown in Figs. 1 and 2 of the drawings and that the blade 34 is in the full line position of Fig. 2 and also that the magnet 48 is energized, it will be evident that in such position of the blade, the circuit of the solenoid 24 is closed through the mercury switch and therefore, pressure fluid has been admitted to the cylinder 19 and the gate or valve 11 is in open position so that the raw sugar or fill-mass is being discharged from the hopper upon the distributing plate 8.

The basket 5 of the extractor is rotated at such high speed that the entering fill-mass is thrown outwardly by centrifugal force from the distributor plate 8 and caused to quickly wall up against the outer cylindrical wall of the basket, forming practically a vertical wall of the material progressively increasing in thickness. When the thickness of this fill-mass wall has increased to such an extent that the inner surface of said mass is just about to contact with the tip of the blade 34, any further increase in the wall thickness will result in a pressure of the material against the concave face of the blade end. Since the moving parts are light in weight, and the friction small, the impact delivered against the blade by the rotating fill-mass will cause the blade to be thrown from the full line to the dotted line position seen in Fig. 2 of the drawings. Such movement of the blade is transmitted through shafts 31 and 39 to the arm 42, causing the armature 44 to approach the core of the magnet 48 where it will be subject to the attractive influence of the magnet and be maintained or held in the position shown in dotted lines in Fig. 6 of the drawings. This of course, also causes the mercury switch to assume the dotted line position of Fig. 6, thus causing the globule of mercury to retreat from the terminals 53 and 54, thereby breaking the circuit through the solenoid 24. Upon de-energization of the solenoid, its core 25 instantly drops, closing valve 21 and opening valve 23 so that the weight 16 may descend by gravity, operating through the flexible connection 14 to close the gate or valve 11 and cut off further supply of the material to the centrifugal basket, the pressure fluid being exhausted from cylinder 19 through pipe 22 and valve 23.

It is evident that a suitable means may be provided for de-energizing magnet 48 when the charging gate or valve is closed, as by connecting the magnet circuit with the supply circuit which feeds the driving motor for the extractor so that the magnet 48 will be energized only when the motor is in operation.

It is further apparent that in order to obtain a definite thickness of the wall of fill-mass within the centrifugal basket, the amount of fill-mass in transit between the charging gate and the basket at the moment the device operates, must be taken into account, together with the further amount which will flow into the basket while the charging gate is closing. This however, may be readily taken care of for any predetermined conditions and product by the proper adjustment of the effective length of the blade 34.

Figure 9:
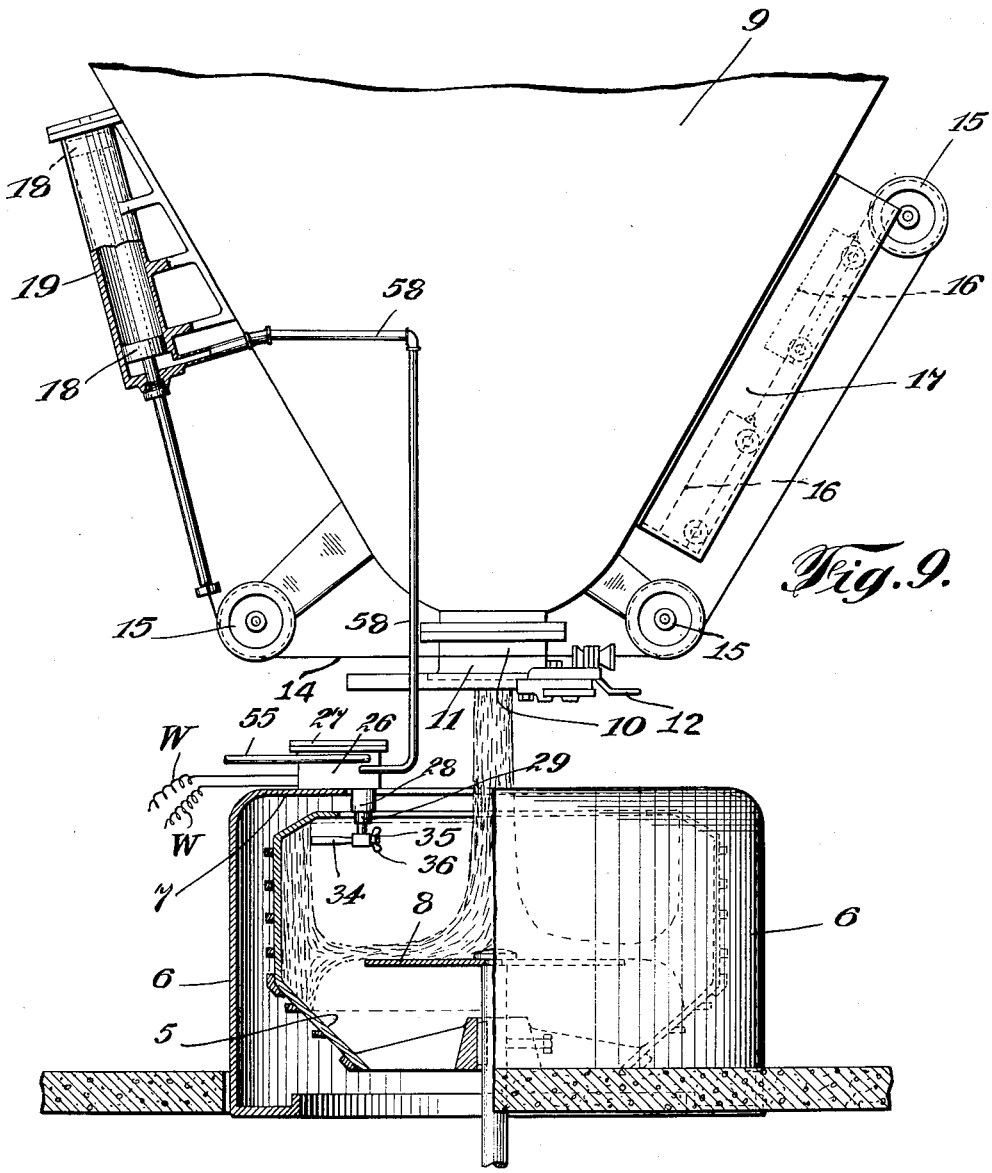
Fig. 9 is a view similar to Fig. 7 also illustrating a centrifugal machine and an alternative means for controlling the movement of the charge supply gate.

In Figs. 9 and 10 of the drawings, we have illustrated an alternative embodiment of the essential features of our invention in which the solenoid control-led valves above referred to are dispensed with, and the admission of air or other pressure fiuid to cylinder 19 and its exhaustion therefrom is directly controlled by the mechanism within the housing 26 and eliminating the use of the mercury switch. In these figures, the various parts corresponding to those employed in the first described form of the invention are designated by similar reference characters.

Referring in detail to Figs. 9 and 10 of the drawings, the wires indicated at W supplying current for the energization of the coil of magnet 48 are electrically connected with a suitable centrifugal switch or automatic air controlled switch arranged in the circuit of the centrifugal machine, and which will open the circuit of magnet 48 momentarily.

Within the housing 26 mounted on the rim of the centrifugal casing, a suitable valve casing 53 is arranged and is provided with a cylindrical bore 54 which receives the air or other pressure fluid from a suitable source of supply through pipe 55. At one end this bore is reduced in diameter and formed with a valve seat 56, said end of the bore communicating with the chamber 57 connected by a pipe 58 with the lower end of the cylinder 19. At the opposite side of this chamber, the lower end of the valve casing 53' has a passage formed therethrough in line with the bore 54' and a valve seat 59 at one end of said passage.

The valve rod or stem 60 extends diametrically across the chamber 57 and is freely movable in the bore 54 and the passage communicating with the opposite side of the chamber 57. This passage and the lower end of the bore 54' are of somewhat greater diameter than the diameter of the rod or stem 60. This rod at its opposite ends is provided with the enlarged portions 61 and 62 respectively, each of which is tapered at one of its ends for engagement upon the respective seats 56 and 59.

The end of arm 42' fixed on the shaft 39 has a pin and slot connection with the lower end of the valve rod 60 as indicated at 63.

It will be apparent from the above description that while magnet 48 is de-energized and the armature carrying arm 43 is in its normal position, the valve part 61 is disengaged from the seat 56 while the valve part 62 is engaged upon the seat 59. Thus the air or other pressure fluid passes from bore 54' and chamber 57 through the pipe 58 to the lower end of the cylinder 19 whereby the charge supply gate is moved to its open position. When the basket of the centrifugal machine is full, the finger or blade 34 is actuated in the manner above explained, thereby rocking the shaft 39 and moving valve rod 60 downwardly, magnet 48 being energized to hold the armature carrying arm 43 in the position shown in dotted lines in Fig. 10. Thus the valve part 61 is engaged upon the valve seat 56 to cut off further supply of compressed air through pipe 55, and valve part 62 is disengaged from its seat so as to permit the air in cylinder 19 to be exhausted therefrom through pipe 58, thus closing the charging gate in the gravity movement of the weight 16.

From the foregoing description considered in connection with the accompanying drawings, the construction, manner of operation and several advantages of our present invention will be clearly understood. It will be seen that the device as above described has few mechanical parts which are of simple form, may be manufactured at nominal cost, and which device may be operatively applied for use in connection with centrifugal extractors now commonly employed in the art, without necessitating any material structural changes therein. While we preferably employ the mercury switches in order to insure the most positive and reliable operation of the device, will be understood that if desired, other types of switches for making and breaking the electrical circuits may be utilized. It is therefore, to be understood that although we have herein referred to several preferable practical embodiments of the essential features of our invention, the same is nevertheless susceptible of more or less modification in the construction of the several parts thereof, and we accordingly reserve the privilege of resorting to all such legitimate changes therein as may be fairly embodied within the spirit and scope of the invention as claimed.

We claim.

1. In combination with a centrifugal extractor having means distributing the fill-mass in a rotating basket to form a wall of progressively increasing thickness and a charge control valve; electro-mechanical means for operating said valve, a circuit control switch for said means, and an actuating member for said switch engaged and operated by the fill-mass when the wall thereof attains a predetermined thickness to render said electro-mechanical means operative to close the valve.

2. In combination with a centrifugal extractor having means distributing the fill-mass in a rotating basket to form a wall of progressively increasing thickness and a charge control valve; electro-mechanical means for operating said valve, a circuit control switch for said means, and an actuating member for said switch engaged and operated by the fill-mass when the wall thereof attains a predetermined thickness to render said electro-mechanical means operative to close the valve, and additional electro-magnetic means for retaining the switch in such operated position.

3. In combination with a centrifugal extractor having means distributing the fill-mass in a rotating basket to form a wall of progressively increasing thickness and a charge control valve; electro-mechanical means for operating said valve, a circuit control switch for said means, an actuating member for said switch engaged and operated by the fill-mass when the wall thereof attains a predetermined thickness to render said electro-mechanical means operative to close the valve, means acting to normally hold said member and the switch in a position in which the valve is held open by the electro-mechanical means, and additional electro-magnetic means for holding the switch against return movement to such normal position after actuation by said member and maintaining said valve in closed position during the operation of the extractor.

4. In combination with a centrifugal extractor having means distributing the fill-mass in a rotating basket to form a wall of progressively increasing thickness and a charge control valve; electro-mechanical means for operating said valve, a circuit control switch for said means, an actuating member for said switch engaged and operated by the fill-mass when the wall thereof attains a predetermined thickness to render said electro-mechanical means operative to close the valve, means acting to hold said member and the switch in position to be so operated by the fill-mass while the valve is open and for returning said member and switch to such normal position after operation, and means effective during the continued operation of the extractor to overcome the action of the last named means and hold said member and the switch against return to a normal position and thereby maintain the charge control valve in closed position.

5. In combination with a centrifugal extractor having means distributing the fill-mass in a rotating basket to form a wall of progressively increasing thickness and a charge control valve; electro-mechanical means for operating said valve, an oscillatable mercury switch controlling the circuit for said means, and means for oscillating the switch in one direction to effect the operation of the electro-mechanical means and close the control valve, said means including an adjustable member adapted to be engaged and operated by the fill-mass when the wall thereof attains a predetermined thickness.

6. In combination with a centrifugal extractor having means distributing the fill-mass in a rotating basket to form a wall of progressively increasing thickness and a charge control valve; electro-mechanical means for operating said valve, an oscillatable mercury switch controlling the circuit for said means, and means for oscillating the switch in one direction to effect the operation of the electro-mechanical means and close the control valve, said means including shafts having their axes disposed at right angles to each other, means for mounting the mercury switch upon one of said shafts, means connected with said shaft to hold the same and the switch in normal position maintaining the charge control valve open, means for transmitting rotation to said shaft from the other shaft, and adjustable means carried by the latter shaft and extending at right angles to the axis thereof adapted to be engaged and operated by the fill-mass when the wall thereof attains a predetermined thickness to thereby actuate the mercury switch and effect operation of the electro-mechanical means to close the charge control valve.

7. In combination with a centrifugal extractor having means distributing the fill-mass in a rotating basket to form a wall of progressively increasing thickness and a charge control valve; electro-mechanical means for operating said valve, an oscillatable mercury switch controlling the circuit for said means, and means for oscillating the switch in one direction to effect the operation of the electro-mechanical means and close the control valve, said means including shafts having their axes disposed at right angles to each other, means for mounting the mercury switch upon one of said shafts, a counterweight connected with said shaft to hold the same and the switch in a normal position maintaining the charge control valve open, means for transmitting rotation to said shaft from the other shaft, adjustable means carried by the latter shaft and extending at right angles to the axis thereof adapted to be engaged and operated by the fill-mass when the wall thereof attains a predetermined thickness to thereby actuate the mercury switch and effect operation of the electro-mechanical means to close the charge control valve, an electro-magnet energized during operation of the extractor, and an armature carried by said counterweight influenced by the electro-magnet to retain the switch means in such operated position and retain the charge control valve in the closed position.

8. In combination with a centrifugal extractor having a rotary basket and housing therefor and means distributing the fill-mass supplied to the basket to form a vertical wall of progressively increasing thickness, and a charge control valve; electro-mechanical means for operating said valve, and automatic switch means controlling the circuit of said electro-mechanical means mounted upon the basket housing and including a member radially positioned within the basket and means for adjusting the same relative to the basket wall, said member adapted to be engaged and operated by the fill-mass when the latter attains a predetermined wall thickness to thereby effect the operation of said electro-mechanical means and close the charge control valve.

9. In combination with a centrifugal extractor having means for distributing the fill-mass in a rotating basket to form a wall of progressively increasing thickness, and a charge control valve; means for moving said valve to its open and closed positions, and means movable with respect to the valve for automatically controlling the operation of said latter means including a member radially positioned within the basket of the centrifugal machine adapted to be engaged and actuated by the fill-mass when the latter attains a predetermined wall thickness to thereby effect the operation of said valve moving means and close the charge control valve.

10. In combination with a centrifugal extractor having means for distributing the fill-mass in a rotating basket to form a wall of progressively increasing thickness, and a charge control valve; gravity actuated means for moving said valve to its closed position, fluid pressure actuated means for moving the valve to its open position, and means for automatically controlling the supply of pressure fluid for operating the latter means, including a supply control valve, an operating member connected therewith, means retaining said member in a normal position to hold the supply valve open, and means for actuating said member to close the pressure fluid supply valve and permit operation of said gravity means to move the charge control valve to closed position including a part radially positioned within the centrifugal basket adapted to be engaged and operated by the fill-mass when the latter attains a predetermined wall thickness, and an electro-magnet for holding said valve operating member in the latter position.

11. In combination with a centrifugal extractor having a rotary basket to receive the fill-mass and a charge control valve external of the basket; means for moving said valve from open to closed position when the fill-mass attains a predetermined wall thickness, said means including a movable member adapted to be directly engaged and actuated relative to the valve by the fill-mass material.

12. In combination with a centrifugal extractor having a rotary basket to receive the fill-mass and a charge control valve; means for moving said valve from open to closed position when the fill-mass attains a predetermined wall thickness, and electro-mechanical means governing the operation of said last named means and including a movable member adapted to be directly engaged and actuated by the fill-mass material.

13. In combination with a centrifugal extractor having a rotary basket to receive the fill-mass and a charge control valve; means for moving said valve from open to closed position when the fill-mass attains a predetermined wall thickness, and electro-mechanical means governing the operation of said last named means and including a circuit control switch, and operating means for said switch having a movable part adapted to be directly engaged and actuated by the fill-mass material.

14. In combination with a centrifugal extractor having a rotary basket to receive the fill-mass and a charge control valve; pneumatically operated means for moving said valve from closed to open position, and electro-mechanical means governing the operation of the last named means including a circuit control switch and operating means for said switch having a part directly engaged and actuated by the fill-mass material when said material attains a predetermined wall thickness in the basket to nullify the influence of said pneumatically operated means and permit movement of the charge control valve to its closed position.

15. In combination with a centrifugal extractor having a rotary basket to receive the fill-mass and a charge control valve; two separate means for moving said valve to its open and closed positions respectively, and means automatically governing the operation of said valve opening and closing means including a movable member adapted to be directly engaged and actuated by the fill-mass material when the same attains a predetermined wall thickness in the basket to effect the operation of said valve closing means.

16. In combination with a centrifugal extractor having a rotary basket to receive the fill-mass and a charge control valve; two separate means for moving said valve to its open and closed positions respectively, and electro-mechanical means automatically governing the operation of said valve opening and closing means and including a circuit control switch operative in one position to effect operation of the valve opening means and a movable switch operating member directly engaged and actuated by the fill-mass material when the same attains a predetermined wall thickness in the basket to operate said switch and nullify the influence of the valve opening means while rendering the valve closing means effectively operative to close the control valve.

17. Means for controlling the loading of a centrifugal basket, embracing a contact arm adjustable to a predetermined distance from the inside wall of the basket and movable inwardly when the built-up wall of material attains a predetermined thickness, and means external of the basket controlled by the movement of said contact arm for cutting off the further supply of material to the basket during the loading operation.

18. Means for controlling the loading of a centrifugal basket, embracing a vertical rock spindle supported to project downward into the centrifugal basket, a contact arm carried by said spindle and adjustable to various predetermined distances from the inside of the peripheral wall of the basket to form contact with the walled-up material in the basket when it attains any desired degree of thickness, a valve for cutting off the supply of material to the basket, and means for closing said valve when the contact arm is moved inward from its predetermined position of adjustment by the pressure of the walled-up material against it.

19. Means for controlling the loading of a centrifugal basket embracing in combination, a supply conduit and a cut-off valve therefor external of the basket and capable of being closed at any time by the operator of the centrifugal, means for automatically closing said cut-off valve, and means actuated by contact with the building-up wall of material inside the basket when the material reaches a predetermined thickness for causing the valve-actuating means to close the valve.

20. Means for controlling the loading of a centrifugal basket, including means for moving a charge control valve positioned externally of the basket from open to closed position when the fill-mass attains a predetermined wall thickness within the basket, and means controlling the operation of said first named means having a movable member adapted to be directly engaged and actuated by the fill-mass material.

NATHANIEL R. ANDREWS.
JACOB J. NEUMAN.